United States Patent Office 3,658,906
Patented Apr. 25, 1972

3,658,906
MULTIPHASE AMINATION PROCESS OF NITROPHENOLS
John Cryer, New Lenox, Harold M. Foster, Park Forest, and Thomas C. Rees, Park Forest South, Ill., assignors to The Sherwin-Wililams Company, Cleveland, Ohio
Filed Jan. 21, 1970, Ser. No. 4,553
Int. Cl. C07c 85/02
U.S. Cl. 260—581
11 Claims

ABSTRACT OF THE DISCLOSURE

A process for aminating nitrophenols by reaction with ammonia in a multiphase liquid system having an aqueous phase and an organic phase. The process is used to make nitroaniline compounds in high yield.

BACKGROUND OF THE INVENTION

Figure 1:
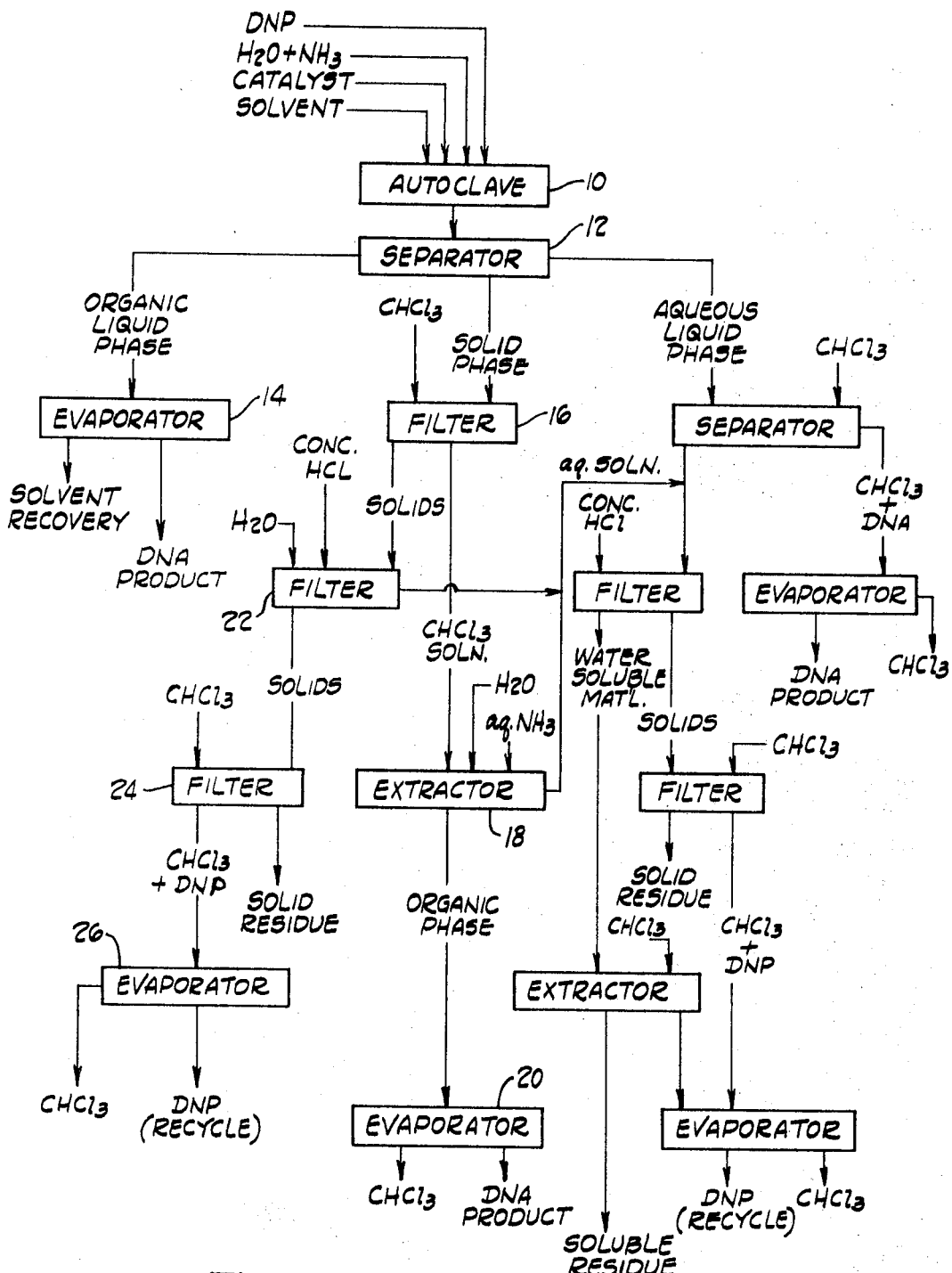

This invention relates to an improved ammonolysis process for making dinitroanilines from dinitrophenols. In particular it relates to synthesis methods for substituting the hydroxyl group of a dinitrophenol having at least one ortho-nitro group with an amino group. The reaction can be represented as follows:

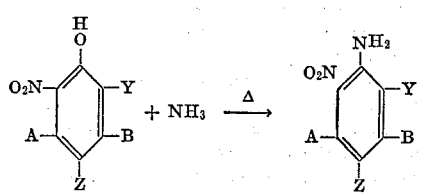

where either Y or Z is nitro and the other is selected from the group of hydrogen, alkyl, aryl and halogen; and where A and B are selected independently from hydrogen and lower alkyl.

In general, the ammonolysis reaction can be effected by heating the nitrophenol precursor to a temperature of at least about 120° C. In the prior art, similar reactions have taken place without a catalyst at higher temperatures. In U.S. Pat. No. 3,111,403, a 2,6-dinitro-4-t-butyl-phenol is reacted with 27% aqueous ammonium hydroxide at about 175° C. for 15 hours with ether extraction of the black solid residue to recover the corresponding dinitroaniline. These reaction conditions give a low yield as compared to catalyzed reactions.

It is known to use sodium formate as a catalyst in the synthesis of mono-nitroanilines. In U.S. Pat. 2,128,700, 2-nitro-4-methylphenol is reacted with excess ammonia in an aqueous medium with sodium formate as catalyst to give a yield of about 35%. In U.S. Pat. 2,894,988, ammonium chloride is used as a catalyst for the ammonolysis of 2-nitro-4-methylphenol (2-nitro-p-cresol) to give yields of more than 90%. However, when the ammonolysis conditions of the prior art teachings are applied to the amination of dinitrophenols having at least one o-nitro group, relatively low yields are obtained.

The dinitroanilines may be used as intermediates in the manufacture of dyes and herbicides. Also, most of the dinitroanilines of the structure defined have herbicidal activity.

SUMMARY OF THE INVENTION

It has been discovered that dinitrophenols can be aminated in high yield using a multi-phase reaction system where one liquid phase comprises water as the reaction phase solvent and a second liquid phase comprises an organic liquid non-miscible with the aqueous reaction phase. High conversion of the precursor nitrophenol with essentially total selectivity to the corresponding nitroaniline can be achieved in a multi-phase system in which an aqueous mixture of ammonia, a nitrogenous salt of a strong acid, and the nitrophenol precursor are charged to a pressure vessel with a hydrophobic organic solvent which has a high solubility for the amination product and is essentially non-miscible with the aqueous solvent of the reaction phase. The ammonolysis reaction can be effected in the temperature range of about 100° C. to 200° C., with high yields being obtained in 3–4 hours at a temperature of 130 to 170° C.

The ammonolysis reaction mixture is removed from the reaction vessel and the phases separated into an organic liquid phase usually containing a major portion of the amination product, an aqueous phase containing most of the unreacted ammonia, salt and precursor, and a solid phase containing some amination product. These phases are then treated to recover the product and unreacted materials. Overall dinitroaniline yields of about 91 to 93% have been achieved using the process.

THE DRAWING

Figure 2:
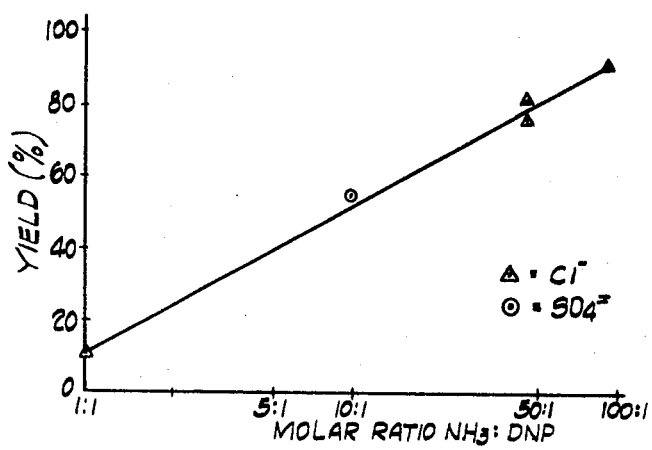
Figure 3:
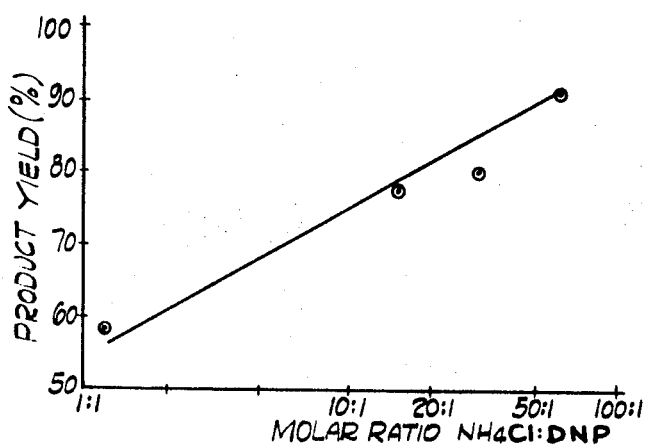
Figure 4:
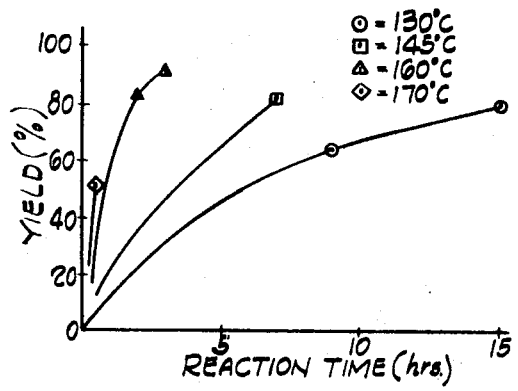

FIG. 1 is a process flow sheet of the process;
FIG. 2 is a semi-logarithmic plot showing the effect of catalyst on product yield;
FIG. 3 is a semi-logarithmic plot of product yield vs. ammonia:phenol ratio; and
FIG. 4 is a reaction rate curve at four different temperatures.

DESCRIPTION OF PREFERRED EMBODIMENTS

The reaction of a dinitrophenol (DNP) with ammonia to produce dinitroaniline (DNA) product can be carried out in a suitable reaction vessel such as an autoclave equipped with an agitator. The temperature of the reaction can vary from about 100 to 200° C. The preferred temperature range is about 130 to 170° C., with optimum yields being obtained at a temperature of about 155 to 165° C. This reaction usually requires a pressure vessel of inert material capable of withstanding about 20 to 40 atmospheres pressure. Stainless steel (type 316) is a suitable material for constructing the reaction vessel. The reaction time usually runs from about ½ to 24 hours, with optimum yields being obtained at about 3–4 hours. A large excess of ammonia and nitrogenous salt are necessary for high yields.

The process flow sheet for a typical amination reaction and recovery system is shown in FIG. 1. The reactants and solvents are charged to an autoclave 10, reacted under the conditions described herein, and removed from the autoclave to a separator 12. The hydrophobic organic liquid phase, the aqueous liquid phase and the solids are separated mechanically. This may be by decanting, centrifuging, filtering or combination of these. The organic liquid phase usually contains most of the product DNA, which can be recovered by removing the organic solvent, as with a rotary evaporator 14.

The solids from the reactor are extracted with a suitable solvent for the product, such as hot chloroform (CHCl₃). It is understood that other extracting solvents such as toluene or ether can be used, but chloroform is used to illustrate the recovery methods. After separating the extracted solids with a filter 16, the chloroform solution is washed with water and aqueous ammonia in an extractor 18. The chloroform phase is then evaporated to remove the solvent in rotary evaporator 20 and recover the DNA product.

The undissolved solids from filter 16 are slurried with concentrated hydrochloric acid and separated with a filter 22. Another solvent extraction of the solids from filter 22 with chloroform removes the remaining DNP which is recovered by separating the solid residue with filter 24 and vaporizing the chloroform on rotary evaporator 26. The DNP may be recycled.

The aqueous phase from separator 12 is extracted with chloroform and the phases separated. The chloroform layer is evaporated to give additional DNA product and chloroform is recovered. The aqueous phase from this separation is combined with the aqueous solutions from extractor 18 and filter 22. This combined aqueous mixture is acidified to a pH of about 1 or less, with concentrated hydrochloric acid and filtered to remove water-soluble material. The filter cake is extracted with chloroform which may be combined with a chloroform extraction of the aqueous solution and evaporated to recover DNP.

The reaction phase consists essentially of water, ammonia, the DNP precursor and the catalytic salt. The ratio of the reaction phase to the hydrophobic organic liquid phase is not critical if there is sufficient liquid in each phase to permit adequate interfacial contact area for transfer of the amination product from the reaction phase to the second liquid phase and sufficient organic solvent in the second phase to dissolve the DNA product.

A wide variety of organic liquids have properties suitable for use as the second hydrophobic phase. In general, these liquids should be non-viscous, inert to the reaction conditions and materials, non-miscible with the aqueous reaction phase, and have relatively high solubility for the amination product under reaction conditions. Low solubility for the nitrophenol precursor is also desirable. These requirements are met by numerous organic compounds, including aliphatic hydrocarbons of 5 to 10 carbon atoms, mononuclear aromatic hydrocarbons, cycloaliphatic hydrocarbons, halogenated hydrocarbons, ethers and substituted benzenoids compounds. Examples of operable hydrophobic solvents for use with aqueous media are n-heptane, benzene, toluene, o-dichlorobenzene, diphenyl ether, cyclohexane and nitrobenzene. Toluene is the preferred organic solvent. It is relatively non-toxic, has low flammability and has a very high solubility for the typical amination products of this invention under the reaction conditions. At its normal boiling point 100 parts toluene can dissolve 56 parts of 2,6-dinitro-4-methylaniline.

Although some amination occurs with lower amounts of ammonia, the amount of free ammonia present to obtain optimum yields in ammonolysis reaction should be at least 5–10 mols per mol. of DNP. It is preferred to run the reaction with a very large excess of free ammonia, with optimum yields coming from those reaction mixtures containing a molar ratio in the range of about 50:1 to 100:1. This relationship is shown in FIG. 2, where the yield of DNA aniline product is plotted linearly on the ordinate axis and the molar ratio of $NH_3:DNP$ precursor is logarithmically plotted on the abscissa. The data shown are from reactions similar to Example I except as noted.

The concentration of free ammonia in the reaction phase is also important. This is reflected in the $H_2O:NH_3$ ratio. Using 29% aqueous ammonia, the $H_2O:NH_3$ molar ratio is about 2.3:1. When this ratio falls substantially precursor is logarithmically plotted on the abscissa. The appears to be due largely to the loss of selectivity. It has been observed that the molar ratio of $H_2O:NH_3$ can run substantially above 5:1 without loss of selectivity.

A large amount of a salt of a strong mineral acid with a nitrogenous base is necessary to obtain optimum yield of the dinitroaniline product. The nitrogeneous base may be ammonia or amine and the strong acid may be hydrochloric, hydrobromic, or sulfuric. Mixtures of these bases and acids may be used. The preferred salts are the ammonium halides and ammonium chloride is used as the standard catalyst in most of the examples given.

The ratio of ammonium salt to the nitrophenol (DNP) in the reaction mixture has a significant effect upon the percentage theoretical yield. In FIG. 3 a semi-log plot of product yield (wt. percent) vs. molar ratio ($NH_4Cl:DNP$) is shown. This plot is related to a series of experiments in which the amount of ammonium chloride is decreased. The standard conditions of Example I are used other than the amount of ammonium salt. In order to obtain acceptable yields, a molar ratio of ammonium salt to nitrophenol of at least 10:1 should be used with optimum yields being achieved at about 60:1.

FIG. 4 is a rectilinear plot of reaction time (hours) vs. product yield (wt. percent) with temperature as the parameter. At 130° C. about 15 hours is required to obtain 80% yield, while the same yields are obtained in less than 7 hours at 145° C. and less than 2 hours at 160° C.

The following examples are given to demonstrate the invention; but, the inventive concept is not limited to the specific examples set forth. Unless otherwise stated, all parts are given by weight in the examples.

EXAMPLE I

Into a Parr autoclave is charged 10 parts by weight of 2,6-dinitro-4-methylphenol, 165 parts of ammonium chloride, 270 parts of 29% aqueous ammonia solution, and 173 parts of toluene. The reaction mixture is stirred and heated to 160° C., which developed a pressure of about 25 atmospheres. The reaction is continued for three hours, after which the mixture is cooled, removed from the reaction vessel and separated into an aqueous liquid phase, an organic liquid phase and a solid phase. After filtering the toluene is removed from the organic phase by evaporation to give 2,6-dinitro-4-methylaniline (2,6-dinitro-p-toluidine). The solids can be extracted with toluene or chloroform to recover additional amine. Also, the filtered solids can be recycled with the aqueous phase. Also present in the solid and aqueous phases is the unreacted ammonium salt of 2,6-dinitro-4-methylphenol, which can be recovered by acidification. Using these reaction conditions and recovery methods, an overall process can realize about 91–93% conversion of the phenol, with essentially 100% selectivity of the nitrophenol to the desired amine product.

EXAMPLE II

The procedure of Example I is followed except that the reaction is run at 130° C. for 15 hours. The conversion is 81% at 99% selectivity.

EXAMPLE III

The procedure of Example I is followed except that 3.3 parts of ammonium chloride is used and the reaction is maintained for 5 hours at 130° C. This gives 33% conversion at 94% selectivity to the desired amine.

EXAMPLE IV

The procedure of Example I is followed except that no toluene is present and the reaction is run at 130° C. for 5 hours. The conversion is 52% and the selectivity is 89%.

EXAMPLE V

The procedure of Example I is followed except that no ammonium chloride and no toluene are present and the reaction is run at 130° C. for 5 hours. The conversion is 25% and the selectivity to the desired amine is 56%.

EXAMPLE VI

The procedure of Example I is followed except that the nitrophenol is 2,6-dinitro-4-phenylphenol and the reaction time is 4 hours. The conversion of the nitrophenol is 92% and the selectivity to 2,6-dinitro-4-phenylaniline is 96%.

EXAMPLE VII

The procedure of Example I is followed except that the nitrophenol is 2,6-dinitro-4-chlorophenol. The conversion is 96% and the selectivity to 2,6-dinitro-4-chloroaniline is 82%.

EXAMPLE VIII

Example I is followed except that the nitrophenol is 2,4-dinitrophenol and the reaction time is 1 hour. The conversion is 85% and the selectivity to 2,4-dinitroaniline is 81%.

EXAMPLE IX

The procedure of Example I is followed except that the nitrophenol is 2,4-dinitro-6-sec-butylphenol and the reaction time is 4 hours. The conversion is 87% and the selectivity to 2,4-dinitro-6-sec-butylaniline is 67%.

EXAMPLE X

The procedure of Example I is repeated except that the nitrophenol is 2,4-dinitro-6-methylphenol, the reaction time is 1 hour, and the organic solvent consists of 175 parts of benzene. The phases are separated. The solid phase is extracted with chloroform to remove 1.7 parts of a 90% 4,6-dinitro-o-toluidine mixture with 9.5% phenol precursor. The extracted solids are treated with concentrated HCl, filtered, and then extracted with chloroform to yield 1 part of another mixture of 25.9% dinitrotoluidine and 72.3% percursor. The remaining solids are 100% dinitrotoluidine. The conversion is 91% with a selectivity to 4,6-dinitro-o-toluidine of 99%.

EXAMPLE XI

The procedure of Example X is followed except that the reaction time is 3 hours. The conversion is 100%, but only with 58% selectivity to the dinitrotoluidine.

EXAMPLE XII

The procedure of Example I is repeated except that the organic solvent consists of 205 parts by weight of n-heptane and the reaction time is two hours. The conversion is 83% and the selectivity is 100%.

EXAMPLE XIII

The procedure of Example I is repeated except that the solvent consists of 260 parts of o-dinchlorobenzene and the reaction time is 2 hours. The yield is 61%.

EXAMPLES XIV–XVIII

The effect of catalyst anion upon the reaction is demonstrated by substituting various ammonium compounds for the ammonium chloride. The standard conditions of Example I are used except where noted. The following table shows the amounts of each salt used, reaction temperature, time, conversion of DNP, selectivity of DNA, and wt. percent yield of DNA.

EXAMPLE XIX

The procedure of Example III is repeated except that an equivalent amount of ammonium iodide salt (10.3 parts) is used as a catalyst and the reaction time is 4.7 hours. The conversion is 21% and the selectivity to the nitroaniline is 100%.

EXAMPLE XX

The procedure of Example III is repeated except that 5.8 parts of ammonium sulfite is used as a Bucherer-type catalyst. The conversion is 61% with 8% selectivity.

EXAMPLE XXI

To demonstrate various methods for introducing the ammonia, the procedure of Example I is repeated except that no ammonia solution is added, 260 parts of toluene are added, 220 parts of water are added, and the precursor and ammonia are added as 10.8 parts of the ammonium salt of 2,6-dinitro-4-methylphenol. The conversion is 83%, with 12% selectivity to the corresponding amine.

EXAMPLE XXII

The procedure of Example I is followed except that 20 parts of dinitromethylphenol, 54 parts of 29% aqueous ammonia, 600 parts of toluene and 6.6 parts of ammonium chloride are reacted at 130° C. for 5 hours. The conversion is 19% and the selectively is 51%.

EXAMPLE XXIII

The procedure of Example I is followed except that the catalytic salt is 210 parts of triethylamine hydrochloride. The amine salt is made by mixing triethylamine with a stoichiometric' equivalent of concentrated equeous HCl solution and evaporating as much water as possible. The conversion is 91% with 75% selectively to the 2,6-dinitro-4-methylaniline.

EXAMPLE XXIV

The procedure of Example XXIII is repeated except that the reaction time is 1 hour. The conversion is 68% with 99% selectivity to the amine product.

In general, the 2,4-dinitrophenols are observed to react faster than the 2,6-dinitrophenols. The presence of branching in an o-alkyl phenol can cause some steric hindrance, as shown in the iso-butyl dinitrophenol example. It is preferred that the alkyl substituent for Y and Z in the structural formula be either a lower branched or unbranched alkyl or higher n-alkyl. Best results were obtained with lower alkyls of 1 to 4 carbon atoms. The aryl substituent is preferably mononuclear, with good results being achieved where Z is phenyl. The halogen substituent preferably has an atomic number of 9 to 17. A and B may be either hydrogen or lower alkyl, the same or different. Alkyls having 1 to 4 carbon atoms appear to have little affect on the ammonolysis reaction when substituted in the 3 and 5 positions of the phenol ring.

While no particular theory of the ammonolysis reaction is adopted as a necessary part of this disclosure, a brief discussion of the theoretical aspects of this process

TABLE

| Example No. | Ammonium salts | Parts by wt. | Temp. (° C.) | Time (hrs.) | Weight percent | | |
|---|---|---|---|---|---|---|---|
| | | | | | Conversion | Selectivity | Yield |
| XIV | Chloride | 165 | 160 | 2 | 84 | 100 | 84 |
| XV | Borate | 120 | 160 | 2 | (¹) | | 38 |
| XVI | Acetate | 250 | 160 | 2 | (¹) | | 37 |
| XVII | Sulfate | 200 | 160 | 2 | | | 86 |
| XVIII | Bromide | 162 | 160 | 3.3 | 88–91 | 97–100 | 85–91 |

¹ Large amounts of tar present. Conversion undetermined.

may be helpful in understanding the invention. The data support a mechanism such as:

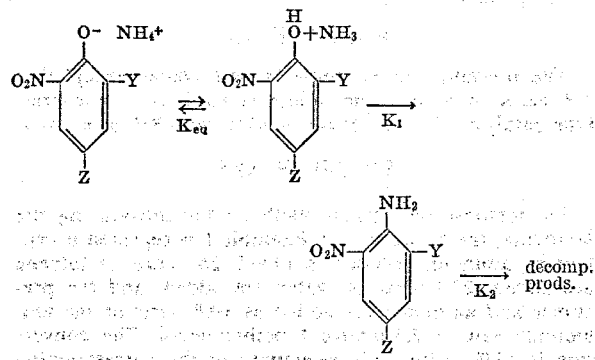

In the aqueous reaction phase an equilibrium exists between the ionized phenol. The use of a large excess of ammonia and a strongly-ionizing ammonium salt forces the reaction to the right with an increase in the amount of unionized phenol, which is believed to be the reactive species during ammonolysis. If the rate ($K_2$) at which decomposition products are being formed is nearly equal to the rate ($K_1$) at which the ammonolysis reaction proceeds, a steady state will be reached in which the concentration of DNA product will remain fairly constant while the DNP precursor is converted. By removing the DNA product from the aqueous reaction phase into the hydrophobic organic solvent phase, the relative reaction rates of $K_1$ and $K_2$ can be greatly affected. This results is increased selectivity to the desired DNA product.

While the invention has been described by reference to specific examples, there is no intent to limit the inventive concept except as set forth in the following claims.

What is claimed is:

1. A process for aminating nitrophenols which consists essentially of reacting a nitrophenol of the formula,

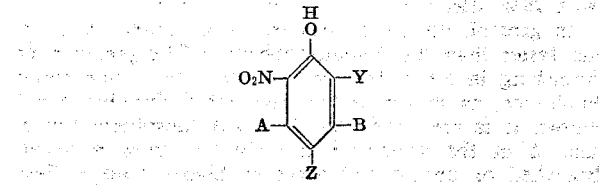

where either Y or Z is nitro and the other is selected from hydrogen, alkyl of 1 to 4 carbon atoms, phenyl and halogen; and
where A and B are selected independently from hydrogen and lower alkyl,
with ammonia in a multiphase reaction system consisting essentially of an aqueous reaction phase containing ammonia, the nitrophenol and a nitrogenous salt of a strong mineral acid and a hydrophobic organic phase which comprises an inert liquid which has a relatively high solubility for the amination product, said organic liquid being non-miscible with water.

2. The process of claim 1 wherein the hydrophobic organic liquid consists essentially of an aliphatic hydrocarbon of 5 to 10 carbon atoms, a mononuclear aromatic hydrocarbon, a cycloaliphatic hydrocarbon, a halogenated hydrocarbon, an ether or a substituted benzenoid compound; and wherein the amination process has a reaction temperature of about 100 to 200° C.; and a reaction time of about ½ to 24 hours.

3. The process of claim 2 wherein the salt in the reaction phase contains an ammonium salt of a strong mineral acid.

4. The process of claim 1 wherein the molar ratio of salt of nitrophenol is at least 5:1.

5. The process of claim 1 wherein the molar ratio of water to free ammonia in the reaction phase is greater than about 2:1.

6. The process of claim 1 wherein Y is nitro; Z is selected from alkyl of 1 to 4 carbon atoms, phenyl and chlorine; and A and B are hydrogen.

7. The process of claim 6 wherein the amination process has a reaction temperature of about 130° C. to 170° C., and a reaction time of about 3 to 4 hours.

8. The process of claim 7 wherein the salt in the reaction phase consists essentially of an ammonium salt of a strong mineral acid and wherein the molar ratio of ammonium salt to nitrophenol is at least about 5:1.

9. The process of claim 8 wherein the molar ratio of free ammonia to nitrophenol is at least 50:1.

10. In the process for converting 2,6-dinitro-4-methylphenol to 2,6-dinitro-4-methylaniline by ammonlysis, the improvement which comprises reacting said phenol with ammonia under agitation for about 3 to 4 hours at a temperature of about 155° C. to 165° C. in a closed multi-phase reaction system consisting essentially of the phenol; at least 5 to 50 mols of ammonia per mol of phenol; about 2 to 5 mols of water per mol of ammonia; at least 5 mols of ammonia salt per mol of phenol; and a sufficient amount of hydrophobic organic liquid to dissolve the aniline product, said organic liquid being inert to the reaction conditions, non-miscible with the aqueous reaction phase.

11. The ammonolysis process of claim 10 wherein the reaction system comprises about 10 parts by weight of the phenol, about 270 parts of 29% aqueous ammonium hydroxide solution, about 165 parts of ammonium chloride, about 173 parts of toluene.

References Cited

UNITED STATES PATENTS 2,894,988   7/1959   Cryer _____ 260—581

JOSEPH REBOLD, Primary Examiner

D. M. PAPUGA, Assistant Examiner

PO-1050
(5/69)

UNITED STATES PATENT OFFICE
CERTIFICATE OF CORRECTION

Patent No. 3,658,906     Dated April 25, 1972

Inventor(s) John Cryer, Harold M. Foster and Thomas C. Rees

It is certified that error appears in the above-identified patent and that said Letters Patent are hereby corrected as shown below:

Column 3, line 66, delete "precursor is logarithmically plotted on the abscissa." and insert therefor -- below about 2:1, the yields are observed to decrease. --.

Column 3, line 66, change "The" to -- This --.

Column 6, line 33, Example XXIII, "equeous" should be -- aqueous --.

Signed and sealed this 25th day of July 1972.

(SEAL)
Attest:

EDWARD M. FLETCHER, JR.
Attesting Officer

ROBERT GOTTSCHALK
Commissioner of Patents